Feb. 11, 1936. C. W. VOGT 2,030,126
FAVOR CARRYING ICE CREAM CONE
Filed June 13, 1933
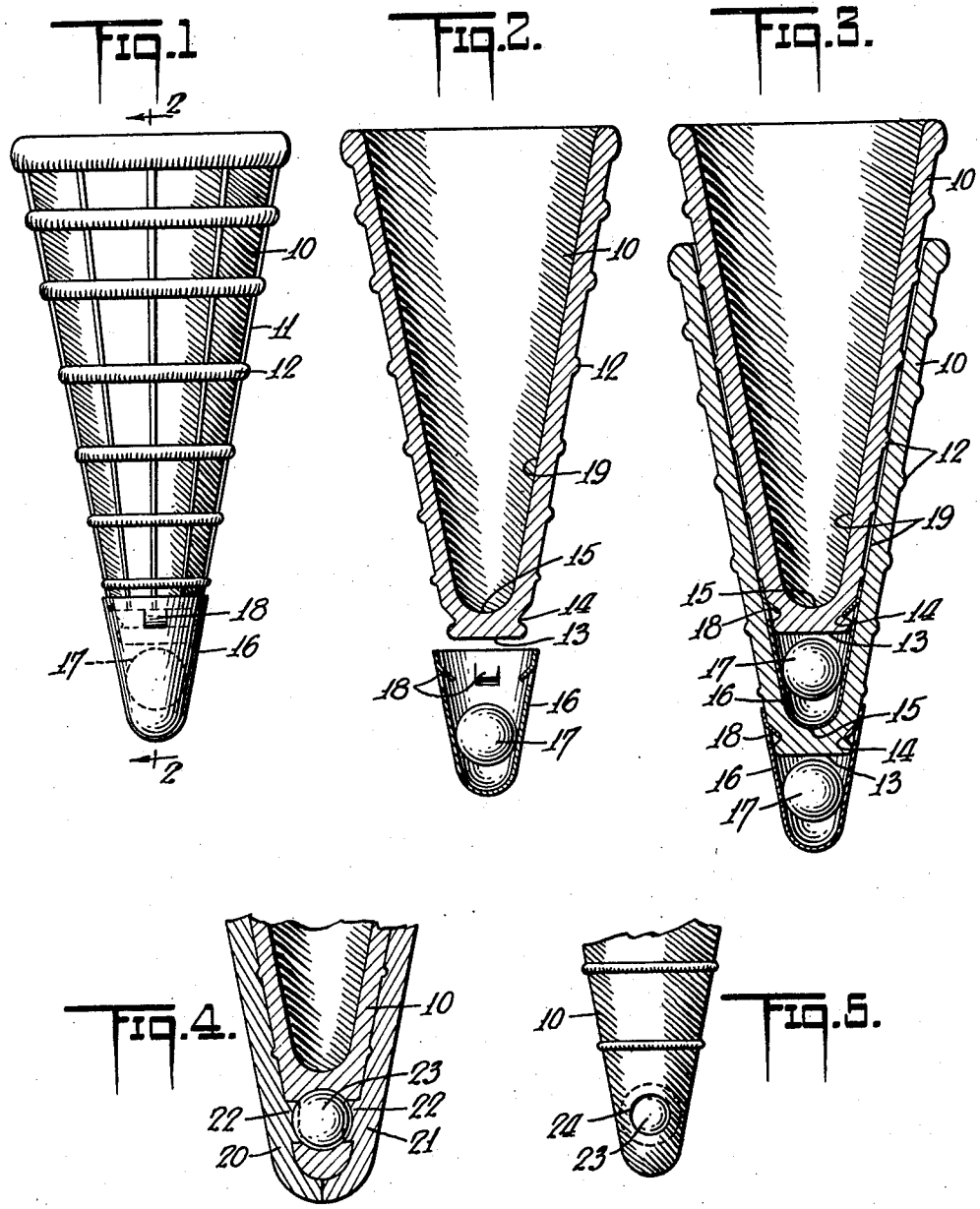
INVENTOR
Clarence W. Vogt
BY
ATTORNEYS Patented Feb. 11, 1936

2,030,126

UNITED STATES PATENT OFFICE 2,030,126

FAVOR-CARRYING ICE CREAM CONE

Clarence W. Vogt, Louisville, Ky., assignor, by mesne assignments, to Vogt Processes, Incorporated, Louisville, Ky., a corporation of Delaware Application June 13, 1933, Serial No. 675,549

4 Claims. (Cl. 99—16)

My invention relates to edible ice cream cones, and more particularly to the provision of an article of this type adapted to perform a secondary function as a carrier for a favor, prize or premium.

An object of the invention is to provide a favor-carrying cone of substantially conventional external appearance, and capable of being nested with companion cones in the usual fashion.

Another object is to provide a cone in which substantially all of the edible cone-forming substance may be consumed in the customary fashion without danger of biting into the favor, the latter preferably being arranged at the tip of the cone.

Another object is to provide a device of this character in which either the favor itself or a non-edible carrier means for the favor is plainly exposed to view, so there is no likelihood of a consumer inadvertently biting into the favor-carrying portion of the cone.

Another object is to provide a cone of this character which will require slight, if any, alteration in the design of the baking molds used for making standard mold forms.

A further object is to provide a cone, which, because of the favor, premium or prize carried thereby, will not only intrigue the imagination of the younger generation, but in which the prize-carrying element may be so designed and so colored or otherwise ornamented that it will materially enhance the attractive appearance of the confection.

Another object is to provide a favor-carrying attachment for ice cream cones which serves to prevent the internal drip from the melting cream from soiling the hands or clothing of the consumer, and which will guard against breakage of the cone tips and consequent leakage.

In one embodiment of the invention, a favor or favor-carrying device is baked directly into the lower end of a conventional cone, the baking mold being preferably so designed that it will afford windows in the tip of the cone through which the favor or its carrier member is exposed.

In another embodiment of the invention, the conventional conical baking mold may have its pointed bottom interiorly built up to produce a truncated cone having a ridge near the lower end thereof, over which a favor-carrying cap or thimble may be snap-fitted, such cap preferably following in contour the outside contour of the tapered portion of the cone in order not to interfere with proper nesting of the cones.

Various expedients may be resorted to for securely attaching the favor-carrying cap to the cone, so that the former will not be inadvertently displaced, such as the snap-fitting above suggested, the application of external pressure on the thimble to press it into interlocked relationship with the cone, the friction fitting of the thimble on the cone, or the disposition of the container with the cone mold, so that the container and cone are firmly keyed together as an incident of baking the cone.

The invention may be more fully understood from the following description in connection with the accompanying drawing, wherein:

Fig. 1 is a side elevation of an ice cream cone having a favor-carrying cap or thimble attached thereto.

Fig. 2 is a disassembled vertical section on the line 2—2 of Fig. 1.

Fig. 3 is a vertical section showing a pair of cones constructed in accordance with Fig. 1 and nested to facilitate transportation, storage and dispensing.

Fig. 4 is a fragmentary sectional detail through the lower end of a cone baking mold, and illustrating one manner in which a favor or favor-retainer may be keyed to the cone during the baking of the latter, and exposed through the cone after the baking is completed, and Fig. 5 is a side view of the lower end of a cone formed by employing the method disclosed in Fig. 4.

The ice cream cone 10 illustrated in Figs. 1 to 3 is of the usual hollow conical formation, and preferably consists of a light pastry, baked between an outer molding form and an inner molding core (not shown). The outer molding form may be grooved or otherwise shaped to provide decorative and strengthening ridges such as longitudinal corrugations 11 and annular corrugations 12. The outer cone molds usually include two parts which are separated to permit removal of the completely baked cone. In the present instance, the cone, instead of terminating in a sharp point, is truncated and presents a flat end surface 13 above which is an annular groove 14 defining a reduced portion 15 of less diameter than the base. This construction may be readily produced by filling in the bottom of the conventional mold with metallic heat conducting material and forming ridges therein just above said material.

A cap or thimble 16 of paper, cardboard, thin gauge metal, or other suitable material is so designed that it may be slipped over the lower end of the cone and interlocked therewith. This thimble is illustrated as of generally conical shape, rounded at its closed end and externally tapered at such an angle that when it is telescoped over the lower end of the truncated cone 10 the taper of the thimble follows and constitutes substantially a continuation of the taper cone.

Before the application of the thimble to the cone, a favor 17 is dropped into the bottom of the thimble. This favor may constitute a small piece of candy, a ball of chewing gum, a rolled-up coupon, or may be of any character desired. The term "favor" as used herein is intended to cover any sort of an article, edible or otherwise, carried by the pastry shell 10.

Near its open end the thimble 16 may be provided with spring tongues 18 struck inwardly from the wall and adapted to snap past the enlarged flattened base 13 of the cone and into the groove 14, whereby effective interlocking of the cone and its thimble tip is afforded.

The pointed tip of the ordinary ice cream cone is readily frangible, and in transportation or use this tip frequently breaks off, leaving an opening through which melting ice cream may drip upon and soil the fingers or clothing of the consumer. The thimble 16 affords a far less frangible structure, and even though the thimble be made of paper or cardboard and be crushed or bent, it will still afford an effective drip cup for melting ice cream if the bottom of the cone proper becomes perforated.

Customarily the hollow cone 10 is internally tapered as at 19. In the present instance the internal wall of the cone at the bottom of the latter is of approximately the same taper and diameter as the exterior taper and diameter of the thimble, so that a plurality of cones with the favor-carrying thimbles assembled thereon may be snugly nested as indicated in Fig. 3.

Not only does the thimble serve as a carrier for the favor and cooperate with the cone body proper to define a closed favor-compartment and strengthen the lower end of the cone, and serve as a drip cup, but these thimbles may be suitably decorated or made of suitably colored material so that they will contribute very materially to the attractive appearance of the cone.

Various expedients other than the snap-fitting action may be resorted to for securing the thimble to the cone. Frictionally fitting the thimble in place or baking the cone with the thimble in the mold in such fashion that the cone is keyed to the thimble as an incident of manufacture of the cone, are merely typical instances of other structures coming within the scope of the invention. The thimbles and cones may be made by separate manufacturers, and may be separately purchased by the dispenser and assembled before the cone is filled with ice cream.

In Figs. 4 and 5 I have shown the two sections 20 and 21 of a baking mold for the cone. Each section near its lower end is provided with an inwardly extending lug 22 adapted to receive and support a favor or a favor-carrying element such as a spherical member 23. At the same time, adequate space is left between the member 23 and those portions of the mold sections which have no internal lugs thereon, for the free flow of batter into the bottom of the mold under and around the favor.

In practice, the favor is dropped into place, the batter is poured, the cone is baked, the sectional mold is opened, and the structure illustrated in Fig. 5 is produced. This figure shows the lower end of a typical ice cream cone having diametrically opposed windows 21 therein through which the member 23 is exposed.

In both of the forms illustrated a visible indication of the presence of the favor is afforded, in one case by the use of the exposed thimble or cap, and in the other case by the provision of openings in the body of the cone through which the favor may be observed. Thus, where hard candies or similar favors are employed, the danger of a consumer inadvertently biting into them is minimized.

Having thus described my invention, what I claim as new and desire to secure by Letters Patent is:—

1. A truncated ice cream cone and a tapered favor-carrying thimble fitted over the truncated end of the cone and reinforcing the latter, said thimble including inwardly presented spring tongues, and said cone being shaped for engagement by said tongues.

2. A truncated ice cream cone and a tapered favor-carrying thimble fitted over the truncated end of the cone and reinforcing the latter, the taper of said thimble following the taper of the cone, said cone having a groove therein adjacent to its lower end and said thimble having means adapted to enter said groove and lock the thimble to the cone.

3. As a new article of manufacture, an ice cream cone having a favor-receiving chamber at the lower end thereof, said cone having an opening therein to expose the article within the chamber.

4. As a new article of manufacture, an edible ice cream container having an open upper end to receive a body of ice cream and a lower handle portion of smaller cross-sectional size and having an opening therein to expose to view an article within the chamber.

CLARENCE W. VOGT.